UNITED STATES PATENT OFFICE.

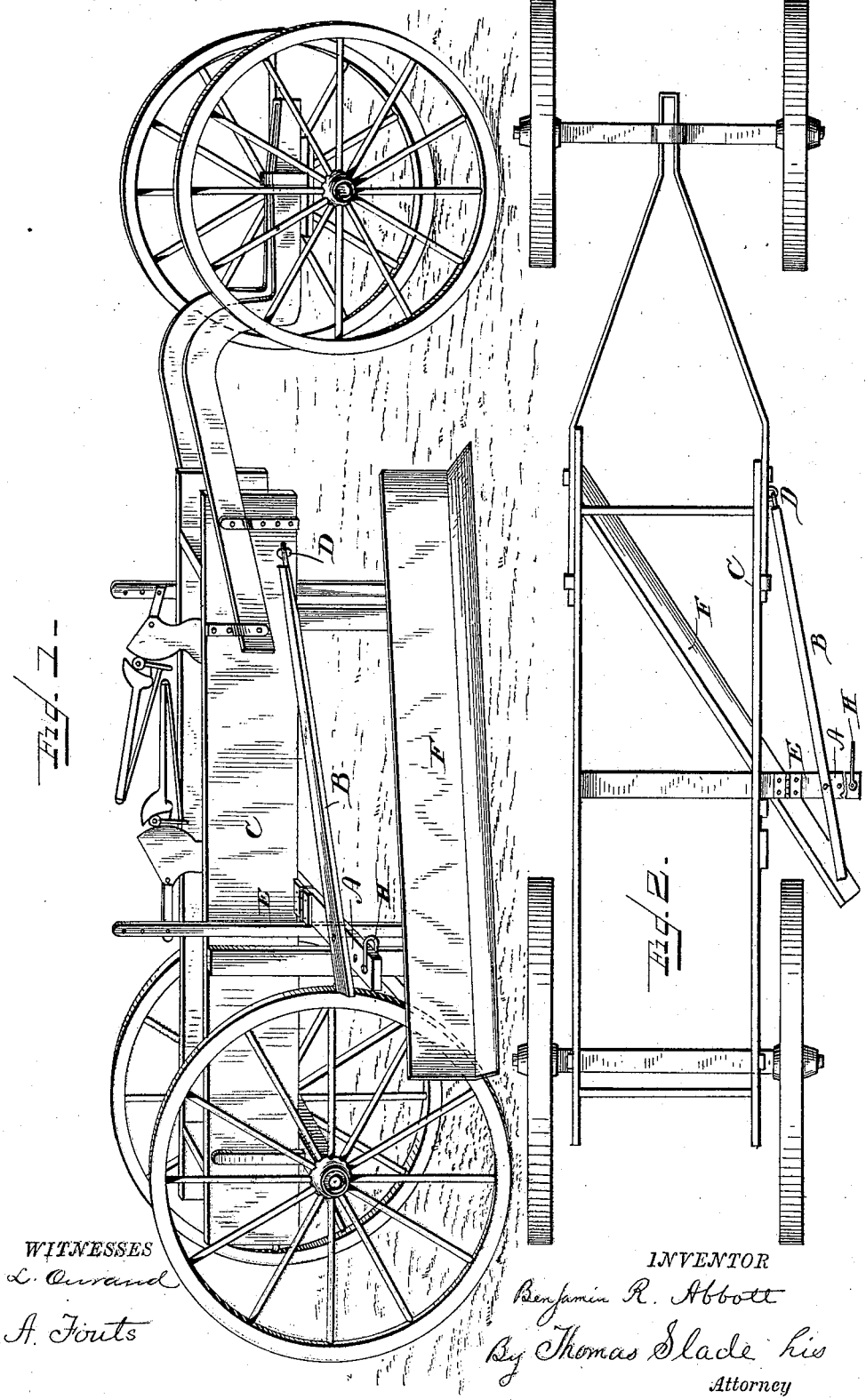

BENJAMIN R. ABBOTT, OF BLOOMINGTON, ILLINOIS.

GRADER OR ROAD-SCRAPER.

SPECIFICATION forming part of Letters Patent No. 321,269, dated June 30, 1885.

Application filed December 2, 1884. (No model.)

*To all whom it may concern:*

Be it known that I, BENJAMIN R. ABBOTT, of Bloomington, in the county of McLean, and in the State of Illinois, have invented certain new and useful Improvements in Graders or Road-Scrapers; and I do hereby declare that the following is a full, clear, and exact description thereof, reference being had to the accompanying drawings, and to the letters of reference marked thereon, making a part of this specification.

This invention relates to that class of graders or road-builders in which is employed a diagonal scraper-bar for the purpose of excavating or leveling roads, streets, ditches, &c. Heretofore, so far as I know, in graders of this class the power has been applied in such a manner that the line of draft coincided with the line of progress and the diagonal scraper-bar placed centrally across this line. By reason of the obliquity of the bar, when it came in contact with considerable resistance, a lateral sliding motion was imparted to the machine, which could not be controlled, thereby impairing its usefulness and efficiency.

Various earth-penetrating attachments have been used to prevent the lateral motion referred to, which has been found objectionable. While they only partially prevented the sliding motion, they absorbed power without contributing to the leveling or excavating.

The object of my invention is to provide a means of applying the draft or propelling power to a grader or excavator having a cutting-bar or scraper placed in a diagonal or angular position, whereby the machine can be easily and effectually controlled by the operator, and the lateral sliding motion prevented without absorbing power.

The invention consists in the parts which will be hereinafter described, and pointed out in the claims.

In the accompanying drawings, Figure 1 is a perspective view of a grader having a scraper or cutting-bar placed in a diagonal or angular position, provided with attachments mounted upon a frame borne upon wheels. Fig. 2 is a top skeleton view of the same.

Like letters refer to like parts in both views.

A is a laterally-extending lever-arm preferably attached to the frame C.

H represents a clevis or other device for the attachment of a portion of the draft or propelling force.

B is a supporting-brace, fastened to the arm A and the frame C.

For the purpose of folding up when not in use, the arm A and its brace-arm are provided with hinges at D and E.

My improvement being more especially designed for the application of horse-power, I will describe its operation when six horses are used. Four of them are hitched to the tongue, so that the line of their draft shall coincide with the line of progress. Two are hitched to the laterally-extending arm, or its equivalent, so that the line of their draft may be parallel to the line of progress, but not coincident therewith. This divided force, or these two forces, are easily controlled by the driver, so that their resultant will neutralize the lateral sliding motion. The length of the arm A is made to have a proper relationship to the comparative amount of the two forces.

It is obvious that the invention herein set forth is applicable alike to a right or a left hand machine—that is to say, the draft-arm A may be applied to either side of the machine. It is necessary, of course, to apply it to the side on which the heel or rear end of the oblique scraper is located. It is further obvious that one or more clevises, H, may be used on the arm A, so as to suit the convenience of any number of horses that may be needed to overcome the lateral pressure of the machine.

Any number of openings may be made in the arm A for the reception of the clevis-pin, whereby the clevis or clevises may be changed to any desired point on the arm to effect a perfect adjustment of the draft.

Having thus fully described my invention, what I claim as new and desire to secure by Letters Patent, is—

1. In a grader or excavator, a scraper or cutting-bar placed obliquely to the line of travel, in combination with a folding draft-arm on the side of the machine, substantially as described, and for the purposes set forth.

2. In a grader or excavator, a scraper or cutting-bar placed obliquely to the line of travel, in combination with a hinged or folding draft-arm on the side of the machine, said draft-arm being provided with a brace-arm also hinged to the machine, substantially as and for the purposes set forth.

In testimony that I claim the foregoing I have hereunto set my hand this 29th day of October, 1884.

BENJAMIN R. ABBOTT.

Witnesses:
 THOS. SLADE,
 R. J. CANNELL.